United States Patent [19]

Bricmont et al.

[11] 4,227,593
[45] Oct. 14, 1980

[54] KINETIC ENERGY ABSORBING PAD

[75] Inventors: Robert J. Bricmont, Allison Park, Pa.; Philip A. Hamilton, Seneca, S.C.; Raymond M. L. Ting, Pittsburgh, Pa.

[73] Assignee: H. H. Robertson Company, Pittsburgh, Pa.

[21] Appl. No.: 855,074

[22] Filed: Nov. 25, 1977

Related U.S. Application Data

[63] Continuation-in-part of Ser. No. 728,949, Oct. 4, 1976, abandoned.

[51] Int. Cl.² ............................................. F16F 7/12
[52] U.S. Cl. ................................... 188/1 C; 293/133
[58] Field of Search ............ 188/1 C; 293/70, 71 R, 293/97, 98, 99, DIG. 3, 133; 428/73, 116; 52/167, 662; 49/9; 256/13.1

[56] References Cited

U.S. PATENT DOCUMENTS

| | | | |
|---|---|---|---|
| 2,728,479 | 12/1955 | Wheeler | 428/116 |
| 3,130,819 | 4/1964 | Marshall | 188/1 C |
| 3,428,150 | 2/1969 | Muspratt | 188/1 C |
| 3,552,525 | 1/1971 | Schudel | 188/1 C |
| 3,624,764 | 11/1971 | Goben | 188/1 C |
| 3,682,463 | 8/1972 | Radimirsch et al. | 188/1 C |
| 3,694,028 | 9/1972 | Andres et al. | 188/1 C |
| 3,806,180 | 4/1974 | Patterson | 188/1 C |
| 3,922,412 | 11/1975 | Yoshikawa et al. | 428/116 |
| 3,981,114 | 9/1976 | Chupick | 293/DIG. 3 |

FOREIGN PATENT DOCUMENTS 1923305 10/1970 Fed. Rep. of Germany ........ 293/71 R Primary Examiner—Edward R. Kazenske
Attorney, Agent, or Firm—George E. Manias

[57] ABSTRACT

A pad adapted to sustain an impact load by stepwise absorption of kinetic energy. The pad incorporates a collapsible, i.e., crushable core adapted to undergo stepwise deformation under the force of the impact load. Stepwise deformation of the core provides, during impact load application, a significant lowering of the peak dynamic load sustained by the pad and applied to the pad support. The normally encountered high buckle-initiating peak loads are entirely avoided by the present pad.

15 Claims, 28 Drawing Figures

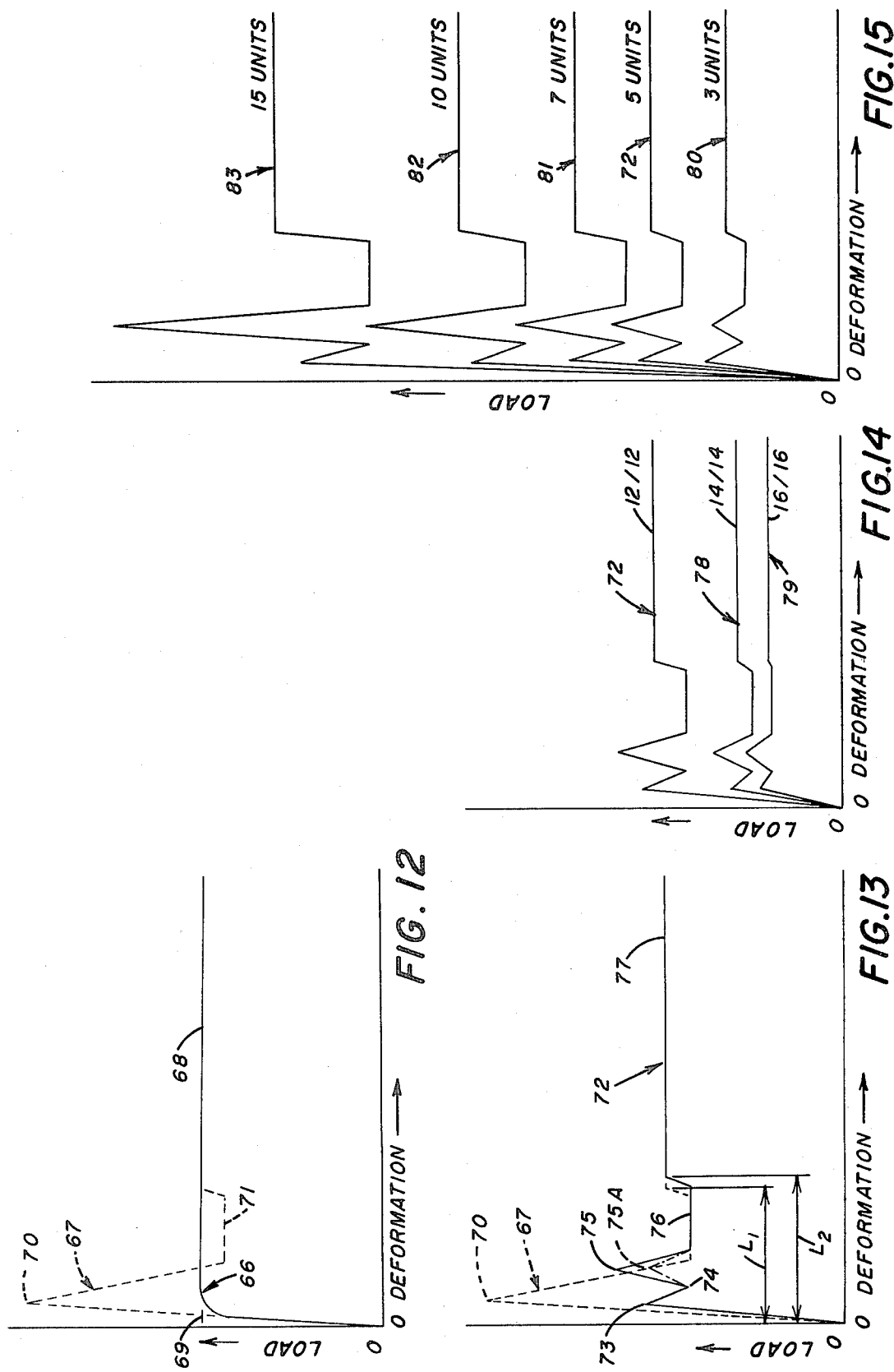

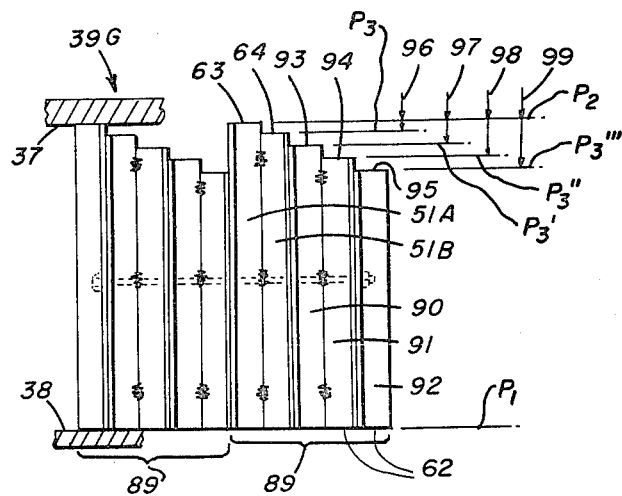
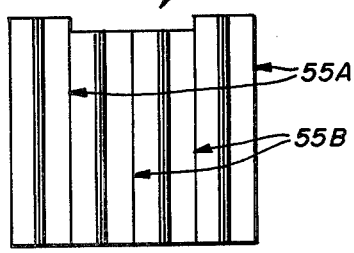
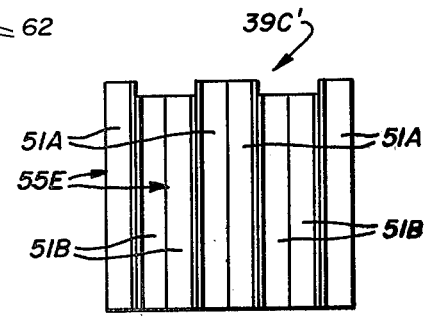
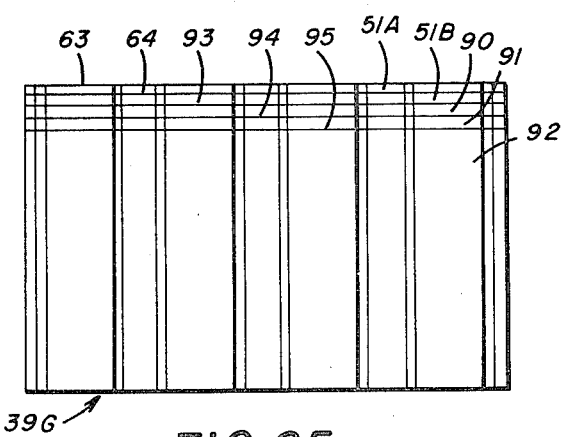
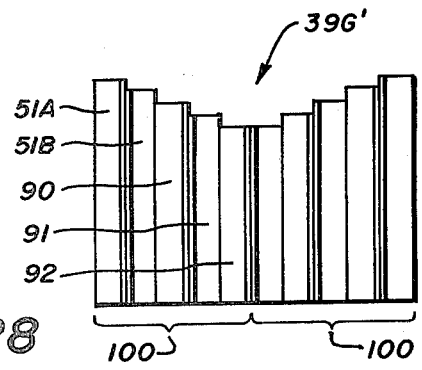

KINETIC ENERGY ABSORBING PAD

CROSS-REFERENCE TO RELATED APPLICATIONS

This is a continuation-in-part of copending application Ser. No. 728,949 filed Oct. 4, 1976, now abandoned, and assigned to the assignee of the present invention.

BACKGROUND OF THE INVENTION

1. Field of the Invention

This invention relates to kinetic energy absorbing devices, and more particularly to pads having a core which, under the force of an impact load, is adapted to undergo stepwise deformation, thereby to reduce significantly the peak dynamic load sustained by the pad.

2. Description of the Prior Art

Nuclear energy plants, nuclear fuel processing plants as well as other process plants incorporate pipes and conduits for conveying fluids under a broad range of pressures. Of particular concern are the extremely high pressure conduits. Should a fracture occur in such a conduit, particularly adjacent to a conduit elbow, the issuing high pressure fluids produce a jet force which whips the broken conduit at an extremely high velocity. An enormous impact load is applied by the whipping conduit to the first stationary object in its path. Absorption of the kinetic energy of such high velocity conduits is achieved by devices known as pipe whip restraint pads. The pad incorporates a core which is crushed by the impact load. Absorption of the kinetic energy is achieved by crushing, that is wrinkle buckling the core elements.

Energy absorbing honeycomb structures are known in the art, see for example, U.S. Pat. No. 3,130,819 (A. C. MARSHALL); U.S. Pat. No. 3,552,525 (C. R. SCHUDEL).

Conventional honeycomb exhibits a uniform energy absorbing characteristic when mechanical forces are applied to the columnar ends of the honeycomb cells. Generally, a honeycomb structure comprises plural corrugated ribbons of sheet material such as metal foil, paper, plastic or the like which are secured together at spaced node points. The resulting structure presents plural hollow, multisided, parallel cells. The application of mechanical forces to the columnar ends of the cells causes the cell walls to fold into small accordian-like pleats resulting in compression of the structure and absorption of energy.

Another characteristic of honeycomb is that its compression or columnar strength is considerably greater than its uniform crush strength. For this reason extremely high initial peak loads are required to initiate buckling of the cell walls. When conventional honeycomb is used as the core of a pipe whip restraint pad, the structural framework or the support to which the pad is secured also must be capable of sustaining the high peak loads.

To eliminate the high buckle-initiating peak loads, the honeycomb core has been partially crushed in a direction parallel with the cells and to a selected depth prior to being assembled into the device, see MARSHALL patent, supra. Since buckling of the core has been initiated, only a relatively low peak load is attained when the pad sustains an impact load. That is, a peak load sufficient only to continue crushing the core.

Although high buckle-initiating peak loads are not encountered by the MARSHALL core when in use, they are encountered during manufacture of the core, that is when precrushing the core. It will be appreciated that core precrushing requires the expenditure of large amounts of costly energy.

Honeycomb cores providing gradually increasing energy absorption also are known in the art, see for example the SCHUDEL patent, supra. Such honeycomb cores have a wedge-shaped end. The anvil—the member which compresses the core—encounters increasing resistance since it must collapse ever increasing cross-sectional areas of honeycomb. Wedge-shaped energy absorbers, when compressed, produce angularly presented splaying forces which cause delamination of the honeycomb at the bonded node points. The angular splaying forces are avoided in the SCHUDEL structure by providing a suitably shaped concavity in the anvil. Wedge-shaped energy absorbers may be formed from an expanded honeycomb structure presenting hexagonal cells or as corrugated spiral wound constructions.

SUMMARY OF THE INVENTION

The principal object of this invention is to provide an impact load sustaining pad requiring buckle-initiating peak loads significantly less than those required by prior art pads.

Another object of this invention is to provide an impact load sustaining pad wherein the heretofore encountered, relatively high, buckle-initiating peak loads are completely eliminated during manufacture of the pad and during use of the pad.

Still another object of this invention is to provide an impact load sustaining device incorporating deformable elements providing stepwise absorption of the kinetic energy of the impact load.

A further object of this invention is to provide an impact load sustaining pad adaptable to absorb the kinetic energy of a broad range of impact loads.

Still another object of this invention is to assemble a crushable core from a plurality of individual cellular units which act independently of each other during energy absorption, whereby the core has a predictable energy absorbing capacity.

Broadly, the present invention provides a pad adapted to sustain an impact load by stepwise absorption of the kinetic energy thereof. The pad includes first means adapted to absorb a quantity of kinetic energy, and at least second means adapted to absorb substantially the balance of the kinetic energy. The second means acts independently of the first means and is offset relative to the first means along the line of action of the impact load. Distributing means is provided for distributing the impact load initially to the first means and subsequently and simultaneously to the first means and to the second means, thereby to achieve a significant reduction in the peak dynamic load sustained by the pad.

More specifically, the present device comprises a face plate adapted to be positioned transversely of and in confronting relation with the line of action of the impact load. A base plate is spaced apart from and substantially parallel with the face plate. A crushable core is positioned between the face plate and the base plate and is adapted to collapse under the force of the impact load. The core includes profiled elements having corrugations extending perpendicular to the face plate and which are assembled in pairs to provide individual metal cellular units which buckle independently of each other under the force of the impact load. The profiled elements have substantially coplanar first end faces adjacent to one plate, substantially coplanar second end faces adjacent to the other plate, and third end faces which are spaced-apart from the other plate and which reside in a plane extending between and generally parallel with the planes of the first and second end faces. The second and third end faces are alternately presented. Moreover, the distance between the second and first end faces is greater than the distance between the third and first end faces. The arrangement is such that the face plate is adapted to distribute the force of the impact load initially to a first set of the profiled elements through the first and second end faces, and subsequently and simultaneously to a second set of the profiled elements through the first and third end faces and to the first set of profiled elements, thereby to reduce significantly the peak dynamic load sustained by the device.

The arrangement is such that the pad sustains two or more separate peak dynamic loads. The first peak load corresponds to that load required to initiate buckling in the first set of profiled elements. As the first set of profiled elements buckle, the sustained load decreases until the face plate engages the third end faces. At this time the pad experiences a second peak load which is a composite of that load required to initiate buckling in the second set of profiled elements, and that load required to continue buckling the first set of profiled elements. Thereafter the sustained load decreases to a minimum and increases again to a constant applied load wherein the first and second sets of profiled elements undergo plastic deformation.

Where all of the profiled elements are of the same thickness or gauge, the second peak load is greater than the first peak load—the second peak load being a composite of that load required to initiate buckling of the second set of profiled elements and that load required to continue buckling of the first set of profiled elements. To reduce the second peak load, the second set of profiled elements may be formed from lighter gauge material. For example, if the first set of profiled elements is formed from 12 gauge material, the second set of profiled elements may be formed from 14 or 16 gauge material. The reduction in the second peak load is attributed to a reduced buckle-initiating peak load for the lighter gauge second set of profiled elements.

Further in accordance with this invention, the core may comprise groups of profiled elements. The end faces of the elements of each group are stepped or tiered whereby a plurality of peak loads are encountered, one for each additional set of the profiled elements.

BRIEF DESCRIPTION OF THE DRAWINGS

FIG. 12 is a graphical presentation of the general relationship between applied load and the deformation of a crushable core;

FIG. 13 is a graphical presentation similar to FIG. 12 comparing the load versus deformation curve of the present unit and a prior art unit;

FIG. 14 is a graphical presentation similar to FIG. 12 illustrating the kinetic energy absorbing capability of the present pad as a function of sheet metal gauge;

FIG. 15 is a graphical presentation similar to FIG. 12 illustrating the kinetic energy absorbing capability of the present pad as a function of the number of metal cellular units in the crushable core;

FIGS. 24 and 25 are end and side views, respectively, wherein the end faces of each group of profiled elements are stepped or tiered; and FIGS. 26 to 28 are end views illustrating further alternative embodiments of the present crushable core.

DESCRIPTION OF THE PREFERRED EMBODIMENTS

Figure 1:
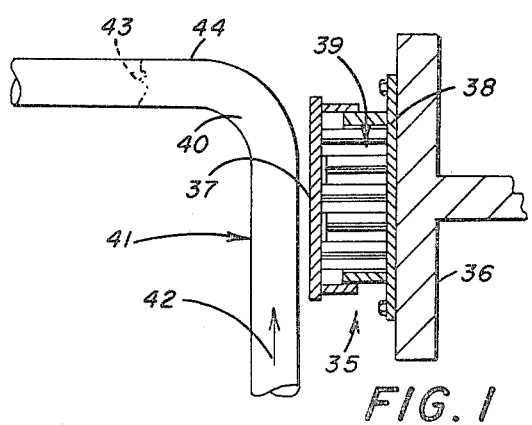
FIG. 1 is a view schematically illustrating a pipe whip restraint pad positioned adjacent to a high pressure conduit.

FIG. 1 schematically illustrates a pipe whip restraint pad 35 of this invention secured to a suitable support such as a structural column 36. The pad 35 includes a face plate 37, a base plate 38 spaced apart therefrom and parallel therewith, and a crushable core 39 extending between the plates 37, 38. The pad 35 is positioned adjacent to an elbow 40 of a high pressure conduit 41. The high pressure conduit 41 conveys high pressure fluids in the direction of the arrow 42. Thus positioned, the pad 35 is adapted to restrain the whipping action of the conduit 41 and to absorb the kinetic energy thereof, should a crack, such as illustrated in dotted outline at 43, develop in the conduit segment 44 downstream of the elbow 40.

Figure 2:
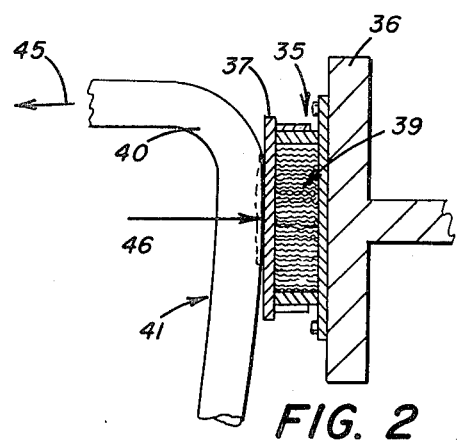
FIG. 2 is a view similar to FIG. 1 illustrating the mode of absorbing the kinetic energy of the broken high pressure conduit.

Should the conduit 41 fracture at the location 43, the issuing high pressure fluids provide a jet force represented by the arrow 45 in FIG. 2, which whips the conduit 41 at a high velocity and with enormous kinetic energy against the face plate 37. The line of action of the jet force 45 is indicated by the arrow 46 in FIG. 2. The kinetic energy of the high velocity broken conduit is absorbed by wrinkle buckling of the elements of the crushable core 39. As will hereinafter be explained in greater detail, the crushable core 39 sustains multiple peak loads each of which is significantly less than the peak load sustained by prior art devices. Thus the structural strength requirements of the structural column 36 or of other suitable pad supports is significantly less than that required when using prior art devices.

Figure 3:
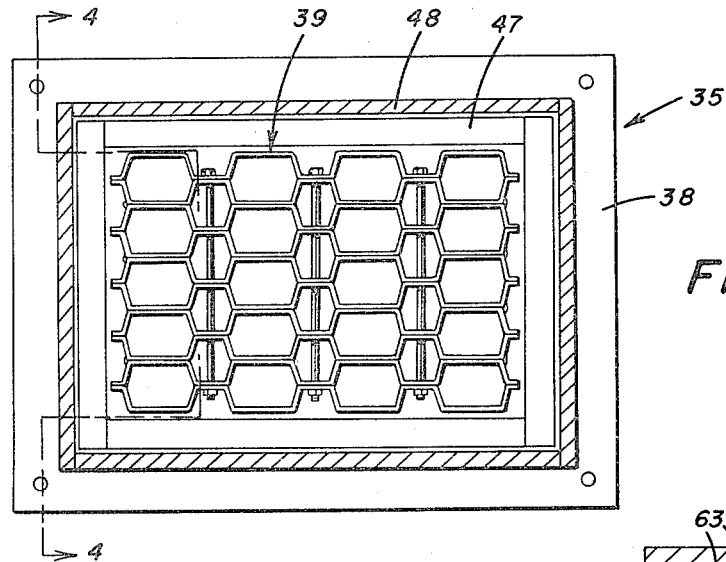
FIG. 3 is a cross-sectional plan view of the present pad taken along the line 3—3 of FIG. 4.
Figure 4:
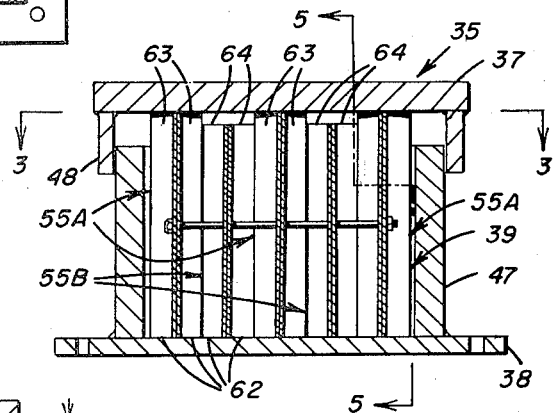
FIG. 4 is a cross-sectional view taken along the line 4—4 of FIG. 3.
Figure 5:
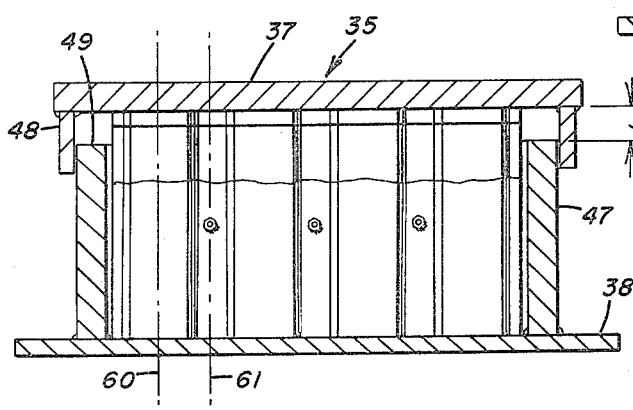
FIG. 5 is a cross-sectional view taken along the line 5—5 of FIG. 4.

Referring to FIGS. 3 through 5, the pad 35 may include an interior perimeter wall 47 secured to the base plate 38, and an exterior perimeter wall 48 secured to the face plate 37. The perimeter wall 48 is positioned in telescoping relation with the interior perimeter wall 47. As best shown in FIG. 5, the interior perimeter wall 47 presents a perimeter face 49 which confronts the interior face of the face plate 37. The perimeter face 49 is spaced-apart from the face plate 37 by a distance indicated at 50. During energy absorption, such as illustrated in FIG. 2, the face plate 37 is displaced through the distance 50. The distance 50 may vary from about 1 inch to about 16 inches.

Figure 6:
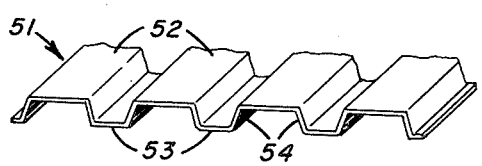
FIG. 6 is a fragmentary isometric view of a profiled sheet metal element useful in the present pad.
Figure 7:
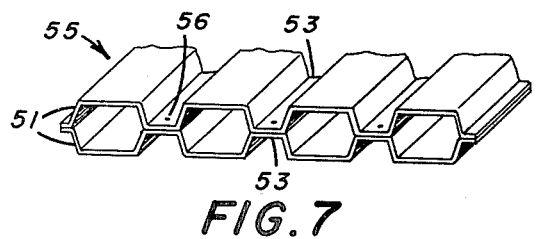
FIG. 7 is a fragmentary isometric view of a metal cellular unit assembled from a pair of the profiled elements of FIG. 6.

The present crushable core is formed from a plurality of elements, such as the profiled sheet metal element 51 illustrated in FIG. 6. The sheet metal element 51 presents alternating crests 52 and valleys 53 connected by inclined webs 54. The profiled sheet metal elements 51 preferably are assembled in valley-to-valley relation and secured together by plural tack welds 56 to provide a metal cellular unit 55 such as illustrated in FIG. 7.

Figure 8:
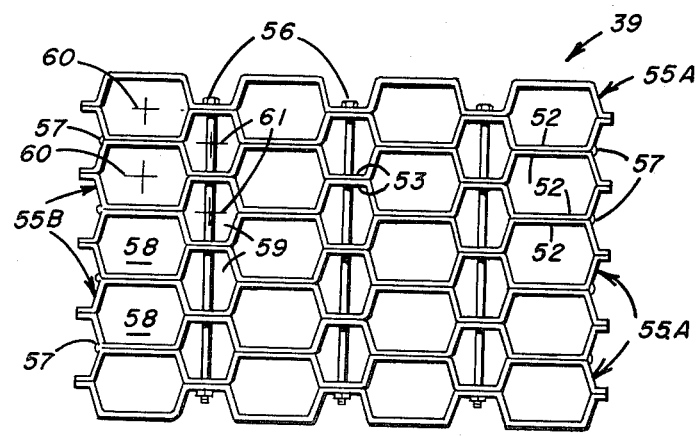
FIG. 8 is an end view of the crushable core assembled from a plurality of the metal cellular units of FIG. 7.
Figure 9:
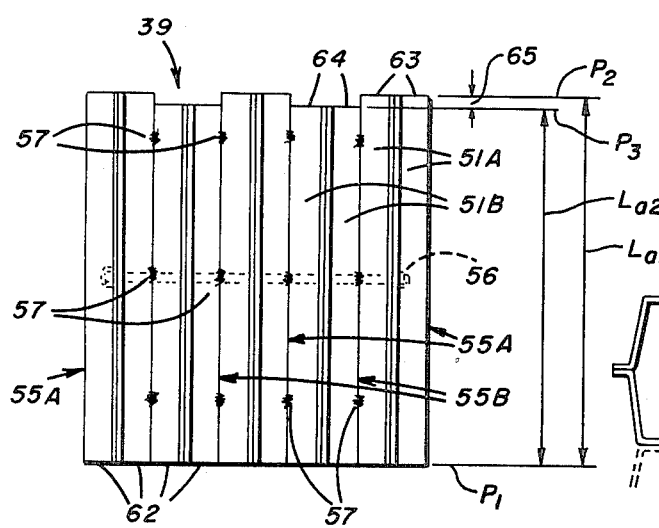
FIG. 9 is an end view of the core of FIG. 8.

Referring to FIGS. 8 and 9, the crushable core 39 provides first means, e.g. plural first metal cellular units 55A, for absorbing a portion of the kinetic energy; and second means, e.g. plural second metal cellular units 55B, for absorbing substantially the balance of the kinetic energy. The metal cellular units 55 are assembled with the crests 52 (FIG. 8) thereof in engagement. To facilitate handling the crushable core 39, plural fasteners 56 may be provided to secure the plural metal cellular units 55 together as a unitary assembly. If desired, spot welds 57 may also be provided as additional securement for the metal cellular units 55. It should be understood that the individual metal cellular units 55 buckle independently of each other under the force of an impact load. Therefore the fasteners 56 and the tack welds 57 may be omitted.

As best shown in FIG. 8, each of the metal cellular units 55 presents plural parallel cells 58. In addition, the adjacent ones of the metal cellular units 55 provide additional longitudinal cells 59. The cells 58, 59 have longitudinal center lines 60, 61, respectively.

In accordance with the present invention, the first metal cellular units 55A have a first axial length $L_{a1}$, whereas the second metal cellular units 55B have a second axial length $L_{a2}$ which is less than the first axial length $L_{a1}$. The first and second metal cellular units 55A, 55B preferably are alternately presented. As best shown in FIG. 9, the sheet metal units 51A and 51B present coplanar first end faces 62 residing substantially in a first common plane $P_1$. The sheet metal elements 51A present second end faces 63 residing substantially in a second common plane $P_2$. The sheet metal elements 51B present third end faces 64 residing substantially in a third common plane $P_3$ which extends between and which is generally parallel with the first and second common planes $P_1$, $P_2$. The third end faces 64 are inwardly offset from the second end faces 63 by an incremental distance indicated at 65. It will be observed in FIG. 5 that the core 39 is positioned such that the longitudinal centerlines 60, 61 of the cells 58, 61 (FIG. 8) are normal to the face plate 37. The crushable core 39 (FIG. 4) presents the first end faces 62 adjacent to the base plate 38, the second end faces 63 adjacent to the face plate 37, and the third end faces 64 inwardly spaced-apart from the face plate 37. The significance of the incremental distance 65 will become apparent later in the specification. As will also become apparent later in the specification, the pad 35 includes distributing means, e.g. the face plate 37, for distributing the force of the impact load initially to the first means (the first metal cellular units 55A); and subsequently and simultaneously to the first means and to the second means (the second metal cellular units 55B).

All of the elements 51 of the metal cellular units 55A and 55B may be formed from the same gauge sheet metal. Sheet metal gauges in the range of 12 to 16 gauge have been found suitable for the present purposes. Alternatively, the sheet metal elements 51A and 51C (FIG. 10) of the first and second metal cellular units 55A, 55C may be formed from sheet metal of different thicknesses. Preferably the second metal cellular unit 55C—the shorter metal cellular unit—is formed from a lighter gauge sheet metal. The metal cellular units 55A, 55C preferably are alternately presented when assembled to provide a crushable core 39A.

Figure 11:
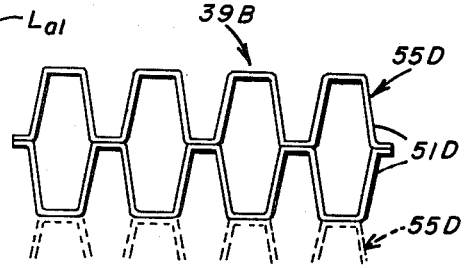
FIG. 11 is an end view of another metal cellular unit useful in the present crushable core.

FIG. 11 illustrates a crushable core 39B comprising plural metal cellular units 55D each assembled from profiled sheet metal elements 51D whose profile differs from the sheet metal elements 51 of FIG. 6. The sheet metal elements may take any suitable profile.

A general relationship between the applied load and the core deformation is graphically presented in FIG. 12. The solid line 66 represents the ideal load versus core deformation curve. The dotted line 67 represents a typical load versus core deformation curve of prior art pads.

It will be observed that in the ideal curve 66, the applied load increases rapidly to the plastic deformation stage 68 during which the core deforms essentially uniformly at a constant load 69. The typical curve 67 departs drastically from the ideal curve 66, in that it reaches a peak load 70 which is considerably higher than the constant load 69. The peak load 70 corresponds to that load required to initiate wrinkle buckling of the crushable core. Following the peak load 70, the typical curve 67 falls to a load level 71 below the constant load 69 and then rises essentially to the constant load 69. It will be appreciated that the relatively high peak load 70 sustained by the restraint pad also must be sustained by the pad support.

The crushable core 39 of the present invention completely avoids the relatively high peak loads sustained by prior art devices during their use or during their manufacture. In FIG. 13, the solid line 72 represents an idealized applied load versus core deformation curve for the crushable core 39 illustrated in FIGS. 8 and 9. The crushable core 39 contains five metal cellular units 55, three units 55A of unit length and two units 55B of a length less than unit length. It will be observed in FIG. 13 that the crushable core 39 sustains a first peak load 73 which is considerably less than the peak load 70 of conventional restraint pads. The peak load 73 corresponds to the buckle-initiating load of the three first metal cellular units 55A. Thereafter, the sustained load reduces to a lower load level 74. At this point, the face plate 37 (FIG. 4) contacts the third end faces 64 of the second metal cellular units 55B. The sustained load increases to a second peak load 75 which is a composite of that load required to initiate buckling in the second metal cellular units 55B and that load required to continue buckling of the first metal cellular units 55A.

Following the peak load 75, the sustained load reduces to a second lower load level 76 and then rises to a plastic deformation stage or load 77. The present restraint pad 35 undergoes a greater amount of deformation to reach the plastic deformation stage 77 than does the typical prior art pad—compare deformation lengths $L_1$ and $L_2$. Notwithstanding the greater deformation length $L_2$, the present pad drastically reduces the peak load sustained by the pad and, hence, the peak load sustained by the pad support.

Where the profiled elements 51 are formed from sheet steel, the incremental distance 65 (FIG. 9) may vary from a minimum of 0.25 inches (0.64 cm) to about 0.75 inches (1.91 cm). When the incremental distance 65 is less than 0.25 inches, the core exhibits a single large peak load. When the incremental distance exceeds 0.75 inches, the core deformation length L (FIG. 13) required to attain the plastic deformation stage is unduly increased with a consequent loss in the energy absorbing capacity of the pad.

Figure 10:
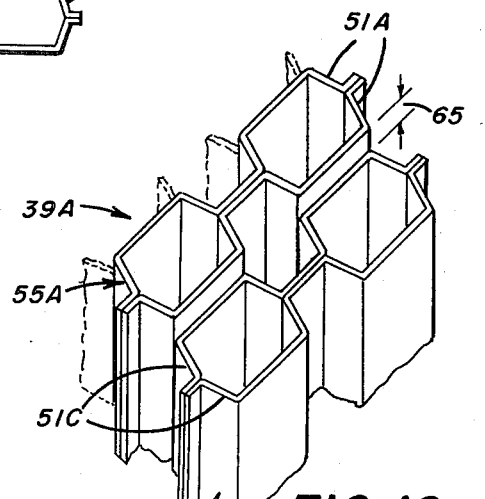
FIG. 10 is a fragmentary isometric view of a pair of metal cellular units formed from different gauge materials.

The larger second peak load 75 may be reduced to a level substantially equal to that of the first peak load 73—see peak load 75A (FIG. 13)—by utilizing the arrangement illustrated in FIG. 10 wherein the profiled elements 51C of the second metal cellular units 55C are formed from lighter gauge sheet metal.

The energy absorbing capacity of the present restraint pad 35 varies with the sheet metal gauge. Specifically, the lighter the gauge the less the energy absorbing capacity. In FIG. 14, the curve 72 corresponds to the crushable core 39 wherein the profiled sheet metal elements thereof are formed from 12 gauge metal. The curves 78, 79, of reducing energy absorbing capacity, correspond to crushable cores utilizing profiled sheet metal elements formed from 14 gauge and 16 gauge metal respectively.

The energy absorbing capacity of the present restraint pad 35 also varies with the number of metal cellular units employed. Specifically, the greater the number of units, the greater the energy absorbing capacity. It will be observed in FIG. 15 that the curve 72 corresponds to five unit core 39 of FIGS. 3 to 5. The curve 80 corresponds to a three unit core and has a reduced kinetic energy absorbing capacity. The curves 81, 82 and 83 correspond to 7, 10 and 15 unit cores having increasing kinetic energy absorbing capacity.

Alternative embodiments of the present crushable core are illustrated in FIGS. 16 through 28. Corresponding numerals will be employed to identify corresponding parts heretofore described.

Figure 16:
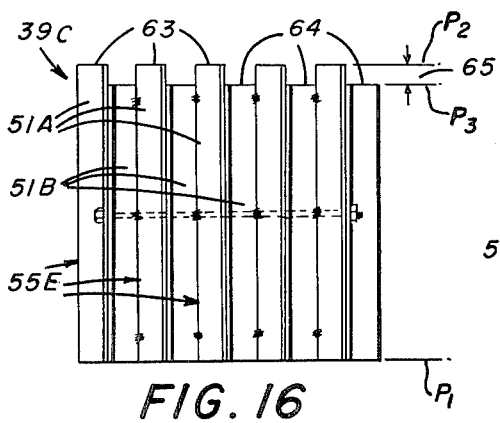
FIGS. 16 and 17 are end and side views, respectively, of an alternative arrangement of the present crushable core.
Figure 17:
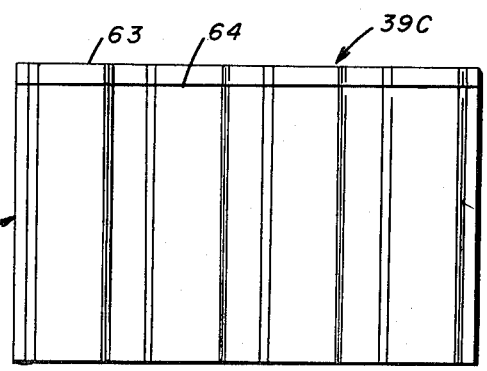

FIGS. 16 and 17 illustrate a crushable core 39C comprising a plurality of metal cellular units 55E. Each of the metal cellular units 55E comprises one of the profiled sheet metal elements 51A having a first axial length $L_{a1}$ and one of the profiled sheet metal elements 51B having the lesser second axial length $L_{a2}$. The crushable core 39C presents a first set of profiled elements, that is the elements 51A; and a second set of profiled elements, that is the elements 51B. The second set of profiled elements presents substantially coplanar third end faces 64 which are inwardly offset from the substantially coplanar second end faces 63 of the first set of elements 51A by an incremental distance indicated at 65 (FIG. 16).

Figure 18:
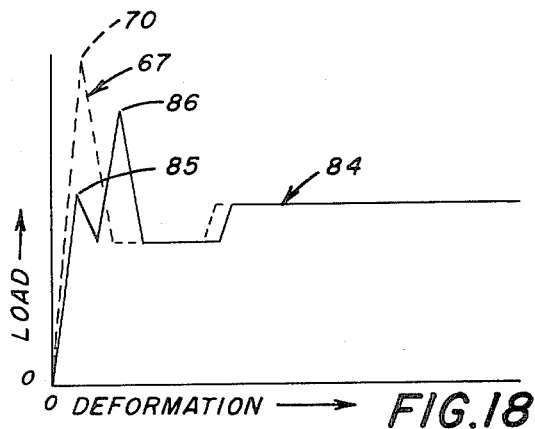
FIG. 18 is a graphical presentation similar to FIG. 13 illustrating the load versus deformation curve of the crushable core of FIG. 16 compared with a prior art unit.

FIG. 18 diagrammatically illustrates the applied load versus core deformation curve identified by the number 84 of the crushable core 39C. It will be observed that the crushable core 39C sustains a first peak load 85 and a larger second peak load 86. Both of the peak loads 85, 86 are significantly less than the corresponding peak load 70 of a typical prior art pad.

Figure 19:
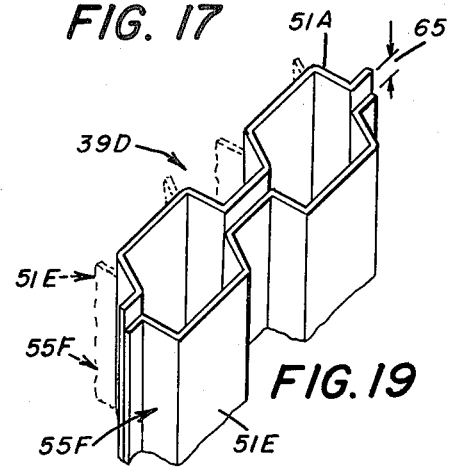
FIG. 19 is a fragmentary isometric view of a metal cellular unit useful in the crushable core of FIG. 16, wherein the profiled elements are of a different gauge thickness.
Figure 20:
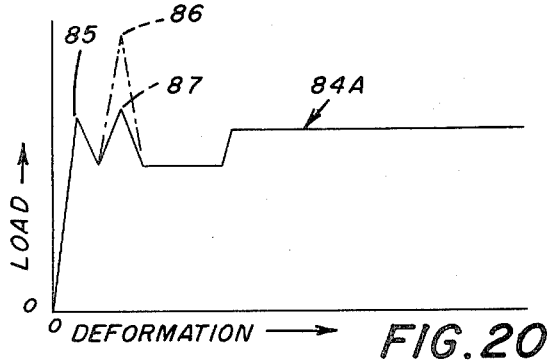
FIG. 20 is a graphical presentation similar to FIG. 18 illustrating the load versus deformation curve produced by employing the metal cellular units of FIG. 19.

FIG. 19 illustrates a metal cellular unit 55F assembled from one profiled sheet metal element 51A and one lighter gauge profiled sheet metal element 51E. The sheet metal elements 51E corresponds, in length, to the shorter sheet metal elements 51B of FIG. 16. A plurality of the metal cellular units 55F may be assembled to provide a crushable core 39D which generates the applied load versus core deformation curve 84A graphically illustrated in FIG. 20. Since the lighter gauge sheet metal elements 51E require a lower buckle-initiating peak load, it will be observed in FIG. 20 that the core 39D sustains a second peak load 87 which may be substantially the same as the first peak load 85 but which is significantly less than the peak load 86 sustained by the crushable core 39C of FIG. 16. Thus the second peak load may be reduced by utilizing thinner gauge elements as the second set of profiled sheet metal elements.

Figure 21:
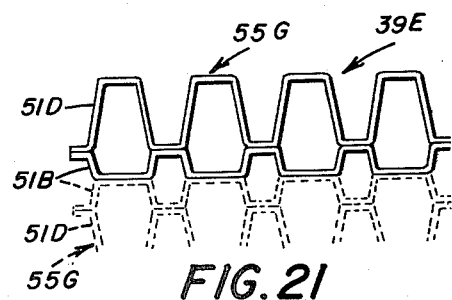
FIG. 21 is an end view of a further alternative embodiment of the present crushable core.

Another method of reducing the second peak load is to utilize sheet metal elements of different column strengths. FIG. 21 illustrates a metal cellular unit 55G assembled from sheet metal elements 51B and 51D. A plurality of the metal cellular units 55G may be assembled to provide a crushable core 39E, wherein the first set of profiled sheet metal elements corresponds to the elements 51D, and wherein the second set of profiled sheet metal elements corresponds to the elements 51B. It should be evident that the greater depth of the elements 51D attributes greater column strength to these units. The shallower depth of the elements 51B attributes a lesser column strength to these units. A further reduction in the second peak load may be achieved by forming the elements 51B from a lighter gauge sheet metal.

Figure 22:
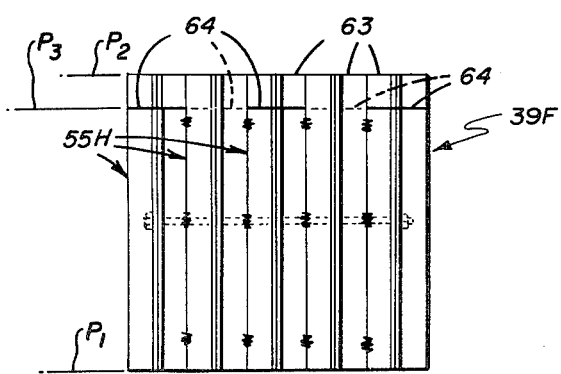
FIGS. 22 and 23 are end and fragmentary isometric views, respectively, wherein the profiled elements present plural offset ends.
Figure 23:
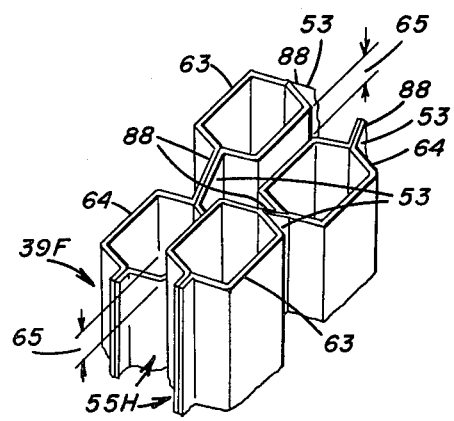

FIGS. 22 and 23 illustrate a further alternative crushable core 39F assembled from a plurality of metal cellular units 55H. As best shown in FIG. 23, the webs 53 of each of the metal cellular units 55H are cut on a bias as at 88, whereby each metal cellular unit 55H presents the substantially coplanar second end faces 63 and the inwardly offset substantially coplanar third faces 64.

FIGS. 24 and 25 illustrate a further alternative crushable core 39G assembled from plural groups 89 of profiled sheet metal elements 51A, 51B, 90, 91 and 92 of decreasing lengths. The profiled elements 51A, 51B, 90, 91, 92 of each group 89, present first end faces 62 adjacent to the base plate 38; a second end face 63 adjacent to the face plate 37; and third end faces 64, 93, 94 and 95 spaced-apart from the face plate 37 by successively larger distances 96 through 99, respectively. The third end faces 63, 93, 94, 95 of the two illustrated groups 89 reside substantially in spaced-apart common planes $P_3'$, $P_3''$, and $P_3'''$ which extend between and are generally parallel with the first and second planes $P_1$, $P_2$. The arrangement is such that the face plate 37 is adapted to distribute the force of an impact load initially to the profiled element 51A through the first and second end faces 62, 63 thereof, and subsequently and successively to the other profiled elements 51B, 90, 91 and 92 through the first and third end faces 62, 64, 93, 94 and 95 thereof, whereby the pad sustains plural peak loads.

The metal cellular units and the profiled elements of the crushable cores 39, 39C and 39G of FIGS. 9, 16 and 24 may be otherwise arranged and still provide a significant reduction in the peak loads sustained by the core. For example, FIG. 26 illustrates a core 39' comprising four metal cellular units, wherein the longer units 55A are provided on opposite sides of the shorter units 55B. FIG. 27 illustrates a core 39C' comprising four of the metal cellular units 55E arranged such that the longer profiled elements 51A are presented at the opposite sides of and at the center of the core 39C'. FIG. 28 illustrates a core 39G' comprising two sets 100 of the profiled elements 51A, 51B, 90, 91, and 92 of decreasing length. The arrangement is such that the longer profiled elements 51A are presented at the opposite sides of the core 39G' and such that the shortest profiled elements 92 are presented at the center of the core 39G'.

TEST RESULTS

Core samples were prepared, each comprising plural metal cellular units such as illustrated in FIG. 7. Each metal cellular unit was assembled from a pair of profiled sheet metal elements such as illustrated in FIG. 6. The metal cellular units were assembled in the manner illustrated in FIG. 8. The metal cellular units had an overall width of approximately 24 inches (61 cm). The width of the crest 52 was 3.625 inches (9.21 cm); and the distance between adjacent crests 52 was 2.375 inches (6.03 cm). The width of the valley 53 was 2.215 inches (5.40 cm). The distance between the inner surfaces of the crests 52 of each cell 58 was 3 inches (7.62 cm). The profiled elements were fabricated from 12 gauge sheet metal. The crushable cores were subjected to static load tests in a testing machine capable of applying a maximum load of 1,200 kips. The test results are summarized below. The "Core Size" identifies the number of metal cellular units in each core sample. Each of core samples 1, 3 and 4 contained metal cellular units of identical length. Core sample 2 was similar to that illustrated in FIGS. 8 and 9. Core samples 5 and 6 were similar to that illustrated in FIG. 16. In the columns headed "Load, Kips", $F_{p1}$ is the first peak load, $F_{p2}$ is the second peak load, and $F_f$ is the average crush load per inch of core deformation at the plastic deformation stage.

| STATIC LOAD TESTS | | | | | | | |
|---|---|---|---|---|---|---|---|
| SAMPLE | CORE SIZE | GAUGE | HEIGHT INCHES | OFFSET INCHES | LOAD, KIPS | | |
| | | | | | $F_{p1}$ | $F_{p2}$ | $F_f$ |
| 1 | 5 | 12 | 16.25 | None | (1) | — | — |
| 2 | 5 | 12 | 16.25 | 0.5 | 910 | 958 | 730 |
| 3 | 4 | 12 | 16.25 | None | 1,079 | — | — |
| 4 | 4 | 12 | 16.25 | None | (2) | — | — |
| 5 | 4 | 12 | 3.75 | 0.375 | 700 | 920 | — |
| 6 | 4 | 12 | 3.75 | 0.375 | 660 | 933 | — |

(1)No evidence of failure at applied load of 1,195 kips-test terminated.
(2)No evidence of failure at applied load of 1,120 kips-test terminated.

The peak load required to initiate crushing of core sample 1 exceeded the capacity of the testing machine and therefore has a value in excess of 1,200 kips. It will be observed that core sample 2 exhibited first and second peak loads which were 24% and 20%, respectively, less than the 1200 kips capacity of the testing machine and hence some higher percentage less than the peak failure load of core sample 1.

Core samples 3 and 4 were identical. Core sample 3 failed in an applied load of 1,079 kips while core sample 4 did not exhibit evidence of failure at an applied load of 1,120 kips. Core sample 5 exhibited first and second peak loads which were 35% and 14.7%, respectively, less than the peak load of core sample 3. Core sample 6 exhibited first and second peak loads which were 38.8% and 13.5% less than the peak load of core sample 3.

We claim:

1. An energy absorbing pad providing stepwise absorption of the kinetic energy of an impact load, comprising:

a face plate adapted to be positioned transversely of and in confronting relation with said impact load;

a base plate spaced-apart from and substantially parallel with said face plate; and a crushable core positioned between said face plate and said base plate and adapted to buckle under the force of said impact load, said core including a first set and a second set of profiled sheet metal elements having corrugations normal to said face plate, said profiled sheet metal elements being assembled in pairs, each of said pairs constituting a metal cellular unit which buckles independently of each other said unit under the force of said impact load;

the elements of said first set and of said second set presenting first end faces adjacent to one said plate and residing substantially in a first common plane which extends generally parallel with said one said plate, the elements of said first set presenting second end faces adjacent to the other said plate and residing substantially in a second common plane which extends generally parallel with said other said plate, and the elements of said second set presenting third end faces spaced-apart from said other said plate and residing substantially in a third common plane which extends between and is generally parallel with the first and second common planes, the distance between the second and third end faces ranging from a minimum of 0.25 inch to a maximum of 0.75 inch;

said face plate being adapted to distribute the force of said impact load initially to said first set of said profiled elements through the first and second end faces thereof, and subsequently and simultaneously to said second set of said profiled elements through the first and third end faces thereof and to said first set of profiled elements, thereby to initiate axial buckling of said second set of profiled elements after initiation of the axial buckling of said first set of profiled elements thereby to significantly lower the dynamic peak loads sustained by said pad and said base plate without significantly reducing the energy absorbing capacity of said pad.

2. The pad of claim 1 wherein the second and third end faces are provided by separate ones of said profiled sheet metal elements.

3. The pad of claim 1 wherein the second and third end faces are provided by separate ones of said metal cellular units.

4. The pad of claim 1 wherein the thickness of the profiled sheet metal elements of said second set is less than that of the profiled sheet metal elements of said first set.

5. The pad of claim 1 wherein the second and third end faces are alternately presented.

6. The pad of claim 1 wherein the profiled elements provided on opposite sides of said crushable core present said second end faces.

7. In combination, a source of anticipated dynamic impact loads, a structure confronting said source of anticipated dynamic impact loads and a pad interposed between said structure and said source and adapted to sustain dynamic impact loads from said source by stepwise absorption of the kinetic energy of said dynamic impact loads, said pad comprising:

a base plate adjacent to said structure;

a face plate confronting said source and extending substantially parallel with said base plate; and a crushable core positioned between said face plate and said base plate and adapted to buckle under the force of said dynamic impact loads, said core including a first set and a second set of profiled sheet metal elements having corrugations normal to said face plate, said profiled sheet metal elements being assembled in pairs, each of said pairs constituting a metal cellular unit which buckles independently of each other said unit under the force of said dynamic impact loads, the elements of said first set and of said second set presenting first end faces adjacent to one said plate and residing substantially in a first common plane which extends generally parallel with said one said plate, the elements of said first set presenting second end faces adjacent to the other said plate and residing substantially in a second common plane which extends generally parallel with said other said plate, and the elements of said second set presenting third end faces spaced-apart from said other said plate and residing substantially in a third common plane which extends between and is generally parallel with the first and second common planes, the distance between the second and third end faces ranging from a minimum of 0.25 inch to a maximum of 0.75 inch;

said face plate being adapted to distribute the force of said dynamic impact loads initially to said first set of said profiled elements through the first and second end faces thereof, and subsequently and simultaneously to said second set of said profiled elements through the first and third end faces thereof and to said first set of profiled elements, thereby to initiate axial buckling of said second set of profiled elements after initiation of the axial buckling of said first set of profiled elements thereby to significantly lower the dynamic peak loads sustained by said pad and said base plate without significantly reducing the energy absorbing capacity of said pad.

8. The combination of claim 7 wherein the second and third end faces are provided by separate ones of said profiled sheet metal elements.

9. The combination of claim 7 wherein the second and third end faces are provided by separate ones of said metal cellular units.

10. A crushable core adapted for stepwise absorption of the kinetic energy of an impact load, said core comprising:

profiled sheet metal elements assembled in pairs, each of said pairs constituting a metal cellular unit which undergoes axial buckling independently of each other said unit under the force of said impact load;

a first set of said elements having a first axial length;

a second set of said elements having a second axial length which is less than the said first axial length;

the difference between said first axial length and said second axial length ranging from a minimum of 0.25 inch to a maximum of 0.75 inch;

the elements of said first set and of said second set presenting first end faces residing substantially in a first common plane extending normal to the axial length of said elements;

the elements of said first set having opposite second end faces residing substantially in a second common plane generally parallel with said first common plane;

the elements of said second set having opposite third end faces residing substantially in a third common plane positioned between and extending generally parallel with said first common plane and said second common plane;

whereby axial buckling of said second set of profiled elements will be initiated after initiation of the axial buckling of said first set of profiled elements thereby to significantly reduce the dynamic peak loads sustained by said core without significantly reducing the energy absorbing capacity of said core.

11. The crushable core of claim 10 wherein the second and third end faces are provided by separate ones of said profiled sheet metal elements.

12. The crushable core of claim 10 wherein the second and third end faces are provided by separate ones of said metal cellular units.

13. The crushable core of claim 10 wherein the thickness of the elements of said second set is less than that of the elements of said first set.

14. The crushable core of claim 10 wherein the second and third end faces are alternately presented.

15. The crushable core of claim 10 wherein the elements positioned on the opposite sides of said crushable core are of said first axial length.

* * * * *